United States Patent [19]
Griffin et al.

[11] Patent Number: 6,046,961
[45] Date of Patent: Apr. 4, 2000

[54] MULTI-LAYER TILED ARRAY

[75] Inventors: Maurice J. Griffin, Tiverton; Fred Nussbaum, Middletown; Gerald T. Stevens, Portsmouth, all of R.I.

[73] Assignee: The United States of America as represented by the Secretary of the Navy, Washington, D.C.

[21] Appl. No.: 08/769,641

[22] Filed: Dec. 16, 1996

[51] Int. Cl.$^7$ ........................................ H04R 17/00
[52] U.S. Cl. ............... 367/153; 367/155; 367/103; 367/105; 367/122; 310/337
[58] Field of Search ........................ 367/140, 153, 367/155, 156, 157, 103, 105, 119, 122, 129; 310/337

[56] References Cited

U.S. PATENT DOCUMENTS 4,638,468  1/1987  Francis ........................... 367/153
5,329,496  7/1994  Smith ............................. 367/140

*Primary Examiner*—J. Woodrow Eldred
*Attorney, Agent, or Firm*—Michael J. McGowan; Robert W. Gauthier; Prithvi C. Lall

[57] ABSTRACT

A sonar sensor array having a multi-layer tiling arrangement for the individual elements that increases surface area available for each element while maintaining the inter-element spacing required to avoid spatial aliasing when the received signals are combined to form a sonar beam. The array comprises outer and inner arrays of transducer elements for converting an acoustic signal to an electrical response. The transducer elements of the outer array are positioned such than a grid of isolation spaces separates each of the transducer elements. The transducer elements of the inner array are also positioned such that a grid of isolation spaces separates each one of the transducer elements. The electrical response generated by the transducer elements of the inner and outer arrays are coupled to a beamformer which processes the responses to produce an output signal.

14 Claims, 3 Drawing Sheets

MULTI-LAYER TILED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to planar sonar arrays. More particularly, the invention relates to the arrangement of transducer elements in planar sonar arrays.

2. Description of the Prior Art

Conventional planar sonar array designs typically comprise ceramic or polyvinylidene fluoride (PVDF) transducer elements arranged in a single plane according to a required inter-element spacing. The inter-element spacing is based on the half wavelength dimension of acoustic signals at the desired operating frequency. There are several disadvantages associated with this conventional array design. First, the inter-element spacing places an upper bound on the center to center distance between adjacent elements. If this upper bound is violated, beamformed acoustic energy will be allowed to fold back spatially, resulting in false indications of received energy. This is analogous to frequency domain aliasing where the Nyquist criteria has been violated, but in the case of a beamformer or spatial filter, the independent variable is bearing instead of frequency.

Furthermore, because the inter-element spacing constrains the maximum separation distance between elements, there is a corresponding upper bound on element size. That is, as the inter-element spacing is decreased, the area available for the element face decreases as a function of the square of the linear dimension of the element's side. Element signal-to-noise ratio is proportional to the volume of an element and decreases as the elements get smaller. Furthermore, since the PVDF transducer elements used in conventional array construction are essentially flat plate capacitors, the capacitance of any element is directly proportional to the electrode area of the element. As the area available for the element electrode decreases, the capacitance is lowered, thereby increasing electronic noise floor levels. Elevated noise floor levels can mask acoustic signals of interest. Furthermore, the effects of the increased noise floor levels can be exacerbated by the fact that at certain operating frequencies, the deep ocean ambient sound pressure level has a notch making it the quietest region in the usable spectrum. It is at these frequencies that problems resulting from the limited capacitance of the elements are most noticeable.

In addition to the sensitivity and detection problems, elevated noise floor levels complicate the fabrication of conventional arrays. To keep the electronic noise floor level as low as possible, the capacitive loading of the elements must be kept at a minimum. The capacitive loading at the elements is kept at a minimum by keeping the lead lengths of any signal conditioners (preamplifiers) as short as possible. However, this requirement complicates fabrication and provides little space to connect the preamplifiers.

Two alternatives have been considered to increase the capacitance in a flat plate capacitor without increasing the area of the electrodes. One approach is to decrease the spacing between the two electrodes of the capacitor. The second approach is to increase the dielectric constant of the material between the electrodes. However, neither of these approaches has proven feasible for use in elements within a sonar array. The first approach decreased the element sensitivity greatly and alternative dielectric materials considered in the second approach either decreased the element sensitivity or increased the thermal noise of the array.

Thus, what is needed is a planar array with an arrangement for the individual elements that increases the capacitance of the elements by increasing their surface area while maintaining the inter-element spacing required to avoid spatial aliasing in the received signals.

SUMMARY OF THE INVENTION

Accordingly, it is a general purpose and object of the present invention to provide a sonar array that maximizes the capacitance of the array elements while maintaining the required inter-element spacing.

Another object of the present invention is to increase the distance between the array element preamplifiers and the elements.

A further object of the present invention is to reduce the electronic noise floor levels of the array element and preamplifier combinations.

These and other objects made apparent hereinafter are accomplished with the present invention by providing a multi-layer tiled arrangement for the individual elements that increases the capacitance of the elements by increasing their surface area while maintaining a required inter-element spacing. The array comprises an outer array and an inner array of transducer elements which convert an acoustic pressure to an electrical response. The transducer elements of the outer array are positioned so as to form a grid of isolation spaces separating each one of the transducer elements. Similarly, the inner array also has transducer elements arranged in a two dimensional matrix with a grid of isolation spaces separating each one of the transducer elements. When an acoustic signal reaches the array, a portion of the signal strikes the transducer elements of the outer array and a portion of the signal propagates through the outer array and strikes the transducer elements of the inner array. The electrical response generated by the transducer elements are conditioned by preamplifiers that are coupled to a beamformer. The beamformer combines and post-processes the conditioned signals from the elements of the outer and inner arrays as signals from a single array of transducers.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
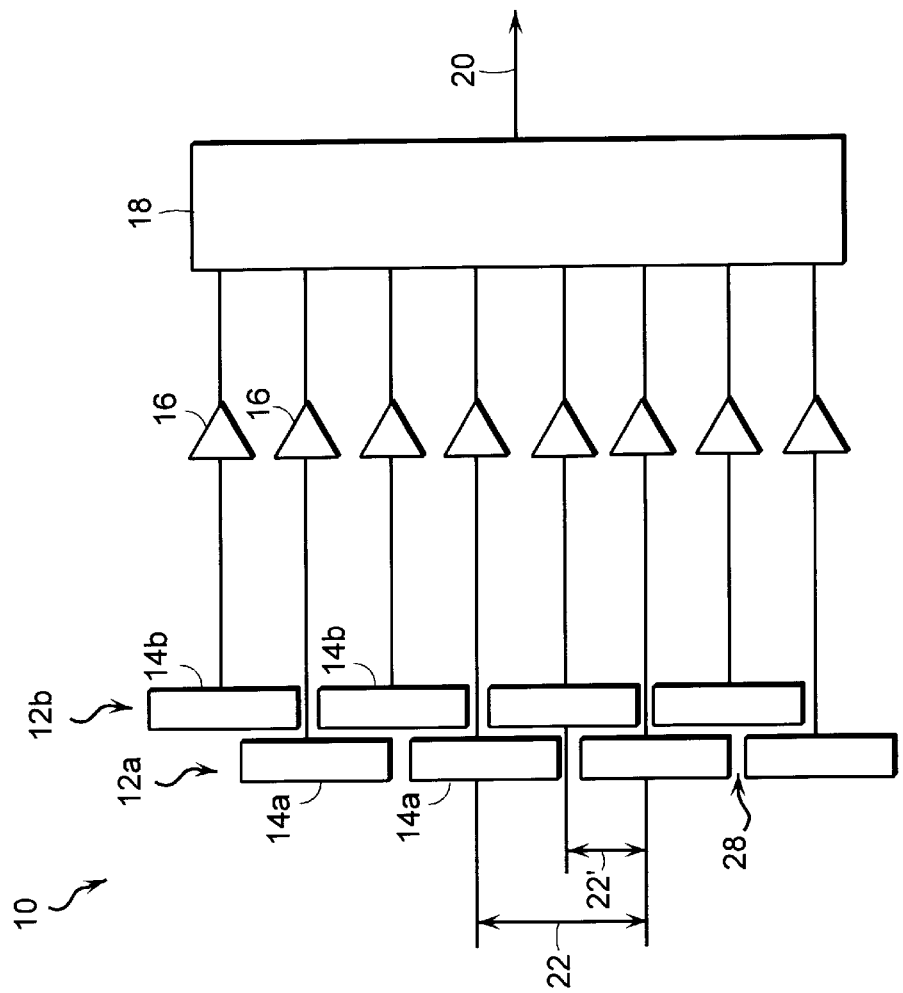
FIG. 1 is a block diagram of a multi-layer tiled array.
Figure 1:
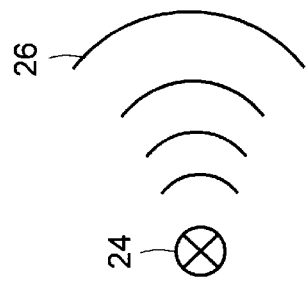

Referring to the drawings, there is shown in FIG. 1 a block diagram of a multi-layer tiled array 10 in accordance with the present invention. Array 10 comprises an outer array 12a of transducer elements 14a and an inner array 12b of transducer elements 14b. Each of the elements 14a and 14b within arrays 12a and 12b, respectively, are electrically independent; thus, each of the elements 14a and 14b are shown separated from their neighboring elements by a space 28. Each of the elements 14a and 14b convert acoustic signals incident upon the element to an electrical response such as a change in voltage, a change in current or the like. Transducer elements 14a and 14b can comprise any conventional acoustically transparent material such as polyvinylidene fluoride (PVDF) or the like. The electrical signals generated by transducer elements 14a and 14b are conditioned by preamplifiers 16 and coupled to beamformer 18. Such coupling of preamplifiers 16 to an array 10 is well-known in the art. Using well known techniques, beamformer 18 processes the conditioned signals from preamplifiers 16 to generate an output signal 20. Such techniques can include beamforming, match filter, or the like.

Processing only the signals from elements 14a of array 12a, results in a conventional array having an inter-element spacing 22 measured from element center to element center. However, processing the signals from elements 14a and 14b as a single array creates a multi-layer array having a reduced inter-element spacing 22' measured between an element 14a of array 12a and a neighboring element 14b of array 12b without reducing the size of the elements.

In operation, a sound source 24 which in the present instance may represent either an active source or an echo from a source located elsewhere, generates acoustic signals 26 which propagate through the water to array 10. When signal 26 reaches array 10 it strikes the transducer elements 14a of outer array 12a and propagates through transducer elements 14a and spaces 28 to strike transducer elements 14b of inner array 12b. The electrical response generated by transducer elements 14a and 14b of outer array 12a and inner array 12b, respectively, are conditioned by preamplifiers 16 that are coupled to beamformer 18. The signals generated by elements 14a and 14b of arrays 12a and 12b are processed as a single array by beamformer 18 to produce output signal 20.

Figure 2:
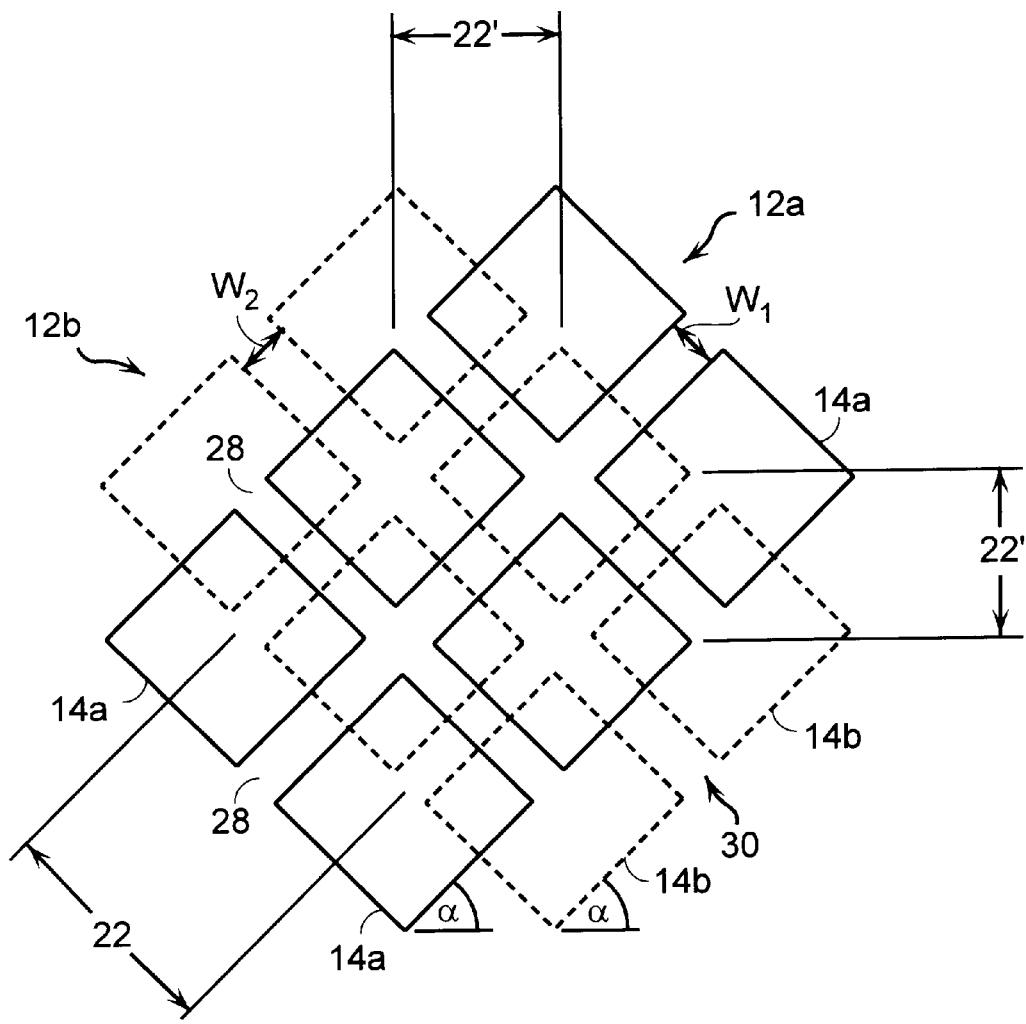
FIG. 2 is a diagram showing an arrangement of transducer elements for a section of a multi-layer tiled array.

Referring now to FIG. 2, there is shown a diagram illustrating an arrangement of transducer elements for a section of a multi-layer tiled array 10. A section of array 10 comprising outer array 12a represented by the solid lines and inner array 12b represented by the dashed lines is shown. Outer array 12a and inner array 12b each comprise a plurality of electrically independent transducer elements 14a and 14b, respectively, arranged in a two-dimensional matrix. The elements 14a of outer array 12a are arranged such that each element 14a is separated from its neighboring elements within array 12a by a distance of "$W_1$"; thereby forming a grid of isolation spaces 28 of width "$W_1$" separating each of the elements 14a. Similarly, elements 14b of inner array 12b are arranged so as to form a grid of isolation spaces 30 of width "$W_2$" separating each of the elements 14b. Widths "W1" and "W2" are negligible in size in comparison to the size of transducer elements 14a and 14b.

Transducer elements 14b of inner array 12b are positioned such that the center of each transducer element 14b is aligned with an isolation space 28 of outer array 12a. Preferably, elements 14b are positioned such that the center of each element 14b in array 12b is substantially aligned with the intersection of two of the isolation spaces 28 of outer array 12a thereby maximizing the inter-element spacing 22'.

Preferably, both arrays 12a and 12b are oriented at angle α of approximately 45 degrees relative to the horizontal to maintain the conventional azimuthal and elevation angle orientation for the inter-element spacing 22'. Because of the square shape of the individual physical elements 14a and 14b and the 45 degree orientation, Bartlett shading is imposed on the individual elements. The elements may take other shapes such as rectangular, circular, or the like; however, the square shape will maximize the element capacitance. Optionally, conventional shading techniques, such as Hamming or the like, can be employed either electronically or computationally to the entire array in addition to any shading technique imposed during fabrication resulting from the shape of the elements.

Figure 3:
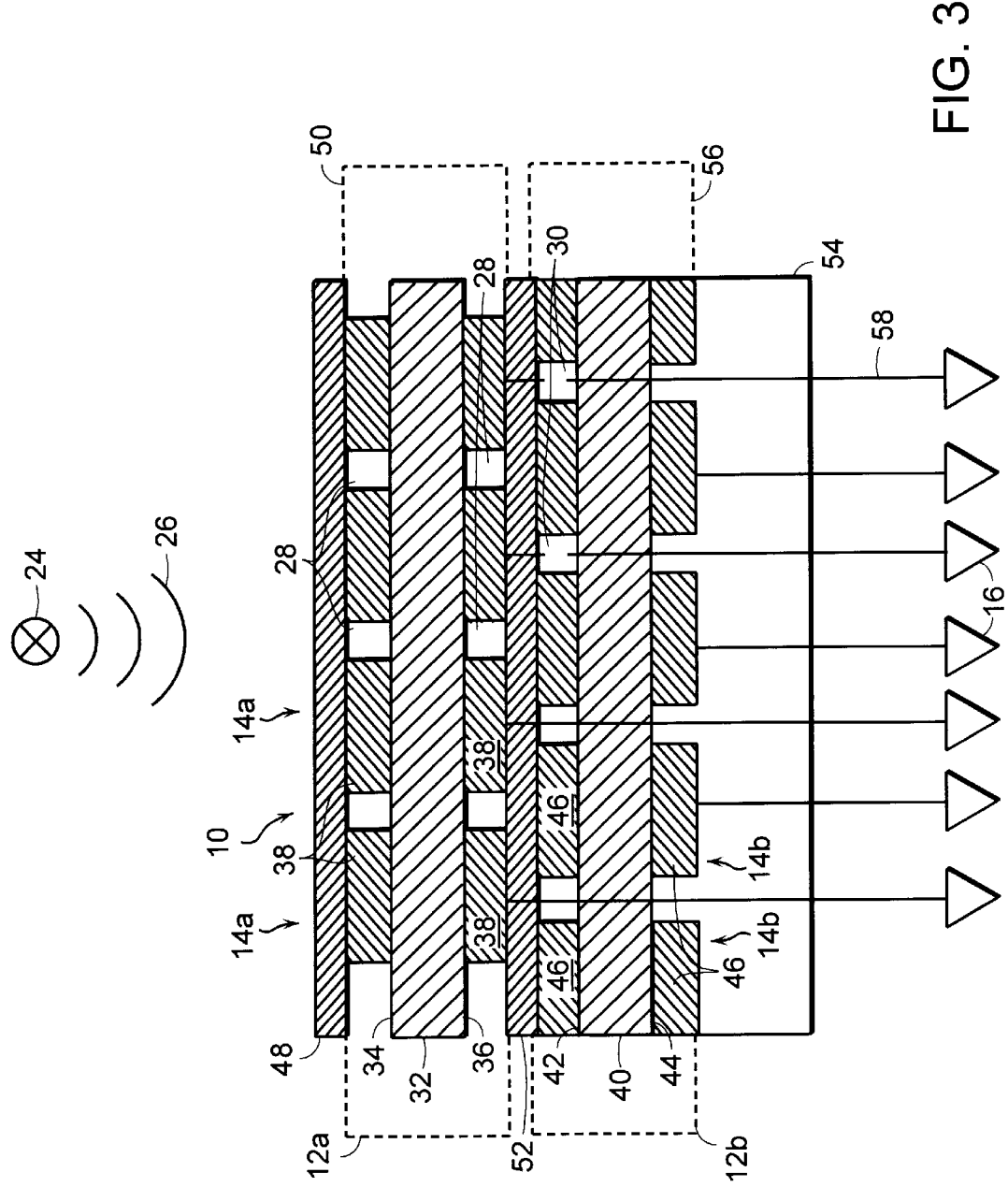
FIG. 3 shows a cross-sectional view of a multi-layer tiled array.

Referring now to FIG. 3, there is shown a cross-sectional view of array 10 according to one embodiment of the present invention. In the embodiment shown in FIG. 3, transducer elements 14a of outer array 12a comprise a layer of PVDF film 32 with a top surface 34 and an opposing bottom surface 36 with a plurality of electrically independent electrodes 38 disposed on each of the surfaces 34, 36. Each electrode 38 can be individually placed on surfaces 34 and 36, or each electrode can be formed by depositing a thin layer of conductive material such as copper or the like on surfaces 34, 36 and etching away material to form a grid of isolation spaces 28. Any conventional technique such as spraying or the like can be used to deposit a thin layer of conductive material. Alternatively, array 12a can comprise a single electrode disposed on surface 34 or 36 with a plurality of individual electrodes disposed on the opposing surface. However, in a preferred embodiment array 12a comprises individual electrodes 38 disposed on each surface to reduce coupling between adjacent elements. Similarly inner array 12b can comprise a layer of PVDF film 40 with a top surface 42 and an opposing bottom surface 44 with a plurality of electrically independent electrodes 46 disposed on each of surfaces 42,44.

A window 48 of acoustically transparent material such as polyurethane or the like can be disposed to outer surface 50 of outer array 12a. The window 48 allows acoustic signals 26 to propagate to elements 14a, 14b and keeps water away from array 10. A non-conductive adhesive 52 can be used to join inner array 12a to outer array 12b and to help prevent any misalignment of elements 14a, 14b. A substrate 54 can be disposed to the lower surface 56 of inner array 12b to support arrays 12a and 12b. Additionally, substrate 54 can be comprised of materials to dampen the acoustic signals propagating through the array thereby reducing any reflection of the signals towards array 10. Leads 58 receive the electrical signals generated by transducer elements 14a and 14b. The signals are then conditioned by preamplifiers 16. Widths "W1" and "W2" are made large enough to allow for the connection of leads 58 to transducer elements 14a and 14b and small enough to obtain the maximum physical size of transducer elements 14a and 14b.

In operation, signal 26 propagates through the water until it reaches array 10. The material used to form transducer elements 14a and 14b is acoustically transparent thereby allowing signal 26 to propagate through transducer elements 14a to transducer elements 14b.

The multi-layer tiled array of the present invention provides a novel arrangement for the individual elements that increases the capacitance of the elements by increasing their surface area while maintaining the inter-element spacing required to avoid spatial aliasing in the received signals. The array provides significant advantages over prior art arrays. First, the array increases the maximum allowable distance between array elements. Second, it increases the capacitance of the elements which can be utilized to obtain a lower electrical noise floor level thereby improving the sonar system's performance in detecting low level target signals. Furthermore the arrangement eases the fabrication of the array by allowing the preamplifiers to be located a greater distance from the array.

What has thus been described is a sonar sensor array that provides a multi-layer tiled arrangement for the individual array elements. The arrangement increases the capacitance of the array elements while maintaining the required inter-element spacing.

It will be understood that various changes in the details, materials, steps and arrangement of parts, which have been herein described and illustrated in order to explain the nature of the invention, may be made by those skilled in the art within the principle and scope of the invention as expressed in the appended claims. For example: a different material might be used for the construction of the array to attain better sensitivity or capacitance. Other shading could be implemented readily during fabrication of the inner and outer arrays or additional shading could also be applied after the sensor either electronically or computationally if further improved sidelobe performance of some other shading design is required.

What is claimed is:

1. A multi-layered tiled array comprising:

an outer array having a plurality of independent outer transducer elements for converting acoustic signals to an electrical response, said outer transducer elements positioned in spaced apart relation so as to define a set of outer isolation spaces separating each one of said plurality of outer transducer elements;

an inner array having a plurality of independent inner transducer elements for converting acoustic signals to an electrical response, each one of said inner transducer elements having a center, said inner transducer elements being in a spaced apart relation so as to define a set of inner isolation spaces separating each one of said plurality of inner transducer elements and each of said inner transducer elements being positioned such that the center of each of said inner transducer elements is aligned with one of said outer isolation spaces; and signal processing means, connected to each of said inner and outer independent transducer elements for processing said electrical responses produced by each of said inner and outer transducer elements as a single array.

2. The multi-layer tiled array of claim 1 wherein the center of each of said inner transducer elements is substantially aligned with the intersection of two of said outer isolation spaces.

3. The multi-layer tiled array of claim 1 wherein each of said inner and outer arrays comprise:

a layer of polyvinylidene fluoride film having a first surface and second surface opposite said first surface; and a plurality of spaced electrically independent electrodes disposed on each of said first and second surfaces.

4. The multi-layer tiled array of claim 3 wherein each one of said plurality of inner and outer transducer elements comprise:

a first transducer electrode selected from said plurality of electrically independent electrodes disposed on said first surface; and a second transducer electrode selected from said plurality of electrically independent electrodes disposed on said second surface.

5. The multi-layer tiled array of claim 3 wherein said plurality of electrically independent electrodes disposed on said first surface of each of said inner and outer arrays are arranged in a two dimensional matrix.

6. The multi-layer tiled array of claim 5 wherein each one of said plurality of spaced electrically independent electrodes disposed on each of said first and second surfaces is rectangular.

7. The multi-layer tiled array of claim 5 wherein each one of said plurality of spaced electrically independent electrodes disposed on each of said first and second surfaces is square.

8. The multi-layer tiled array of claim 1 wherein said outer array comprises:

a layer of polyvinylidene fluoride film having opposing first and second surfaces;

a layer of conductive material disposed on said first surface; and a plurality of spaced electrically independent electrodes disposed on said second surface.

9. A multi-layered tiled array comprising:

an outer array having a plurality of independent outer transducer elements for converting acoustic signals to an electrical response, said outer transducer elements positioned in spaced apart relation so as to define a set of outer isolation spaces separating each one of said plurality of outer transducer elements; and an inner array having a plurality of independent inner transducer elements for converting acoustic signals to an electrical response, each one of said inner transducer elements having a center, said inner transducer elements being in a spaced apart relation so as to define a set of inner isolation spaces separating each one of said plurality of inner transducer elements and each of said inner transducer elements being positioned such that the center of each of said inner transducer elements is aligned with one of said outer isolation spaces;

wherein said responses produced by each of said inner and outer transducer elements are processed as a single array.

10. The multi-layer tiled array of claim 9 wherein the center of each of said inner transducer elements is substantially aligned with the intersection of two of said outer isolation spaces.

11. The multi-layer tiled array of claim 9 wherein each of said inner and outer arrays comprise:

a layer of polyvinylidene fluoride film having a first surface and second surface opposite said first surface; and a plurality of spaced electrically independent electrodes disposed on each of said first and second surfaces.

12. The multi-layer tiled array of claim 11 wherein said plurality of electrically independent electrodes disposed on said first surface of each of said inner and outer arrays are arranged in a two dimensional matrix.

13. The multi-layer tiled array of claim 12 wherein each one of said plurality of spaced electrically independent electrodes disposed on each of said first and second surfaces is rectangular.

14. The multi-layer tiled array of claim 12 wherein each one of said plurality of spaced electrically independent electrodes disposed on each of said first and second surfaces is square.

* * * * *